United States Patent
Adolph et al.

(10) Patent No.: US 6,456,656 B1
(45) Date of Patent: Sep. 24, 2002

(54) METHOD AND APPARATUS FOR CODING AND FOR DECODING A PICTURE SEQUENCE

(75) Inventors: Dirk Adolph, Ronnenberg; Meinolf Blawat, Hannover, both of (DE)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/182,030

(22) Filed: Oct. 29, 1998

(30) Foreign Application Priority Data

Nov. 25, 1997 (EP) .............................. 97203687

(51) Int. Cl.$^7$ ................................ H04B 1/66
(52) U.S. Cl. .............................. 375/240.12; 348/415.1; 382/236
(58) Field of Search ..................... 375/240.16, 240, 375/240.18, 240.03, 240.12, 240.02, 240.01, 240.2, 240.14, 240.13; 348/400.1, 402.1, 403.1, 407.1, 413–418, 699, 556, 943, 553, 441, 445, 624; 382/111, 236; 341/65

(56) References Cited

U.S. PATENT DOCUMENTS

| | | | |
|---|---|---|---|
| 4,745,473 A | * 5/1988 | Hall | 358/426 |
| 4,910,586 A | * 3/1990 | Sharpe | 375/240.01 |
| 5,218,435 A | 6/1993 | Lim et al. | 358/133 |
| 5,331,348 A | 7/1994 | Knauer et al. | 348/402 |
| 5,790,207 A | * 8/1998 | Jung | 375/240.14 |
| 5,835,034 A | * 11/1998 | Seroussi et al. | 341/65 |
| 5,909,252 A | * 6/1999 | Ueda et al. | 375/240.12 |
| 5,959,693 A | * 9/1999 | Wu et al. | 348/624 |
| 6,064,436 A | * 5/2000 | Okada | 375/240.16 |
| RE37,057 E | * 2/2001 | Lee | 348/556 |

FOREIGN PATENT DOCUMENTS

| | | |
|---|---|---|
| EP | 405 754 A2 | 1/1991 |
| EP | 416 918 A2 | 3/1991 |
| EP | 578 438 A2 | 1/1994 |
| EP | 622 959 A1 | 11/1994 |

OTHER PUBLICATIONS

Fujimura et al., *Application of Leaky Prediction to an Interframe Coding Scheme*, Electronics & Communications In Japan—Part I—Communications, Apr. 1997, pp. 20–28.

* cited by examiner

*Primary Examiner*—Chris Kelley
*Assistant Examiner*—Gims Philippe
(74) *Attorney, Agent, or Firm*—Joseph S. Tripoli; Ronald H. Kurdyla; Guy H. Eriksen

(57) ABSTRACT

Motion-compensated hybrid codecs are used in data compression for moving picture sequences. By virtue of the regular insertion of intraframe-coded pictures, these compression methods enable access to any desired individual pictures in the entire bit stream or the playback of the bit stream from virtually any desired location. A disadvantage is the high bit outlay necessary for intraframe-coded pictures. In a feedback loop, a codec usually contains a simulation of the receiver-end decoder, whose coding errors can thus also be taken into account by the encoder. According to the invention, an attenuation element is inserted into this feedback loop. The coding and the receiver-end decoding of intraframe-coded pictures becomes superfluous. After the receiver-end decoding of a few pictures, beginning with a grey-scale picture as starting picture, a viewer does not perceive a difference between picture sequences which are coded in a known manner, and contain I pictures at relatively short intervals, and picture sequences which are coded according to the invention.

11 Claims, 1 Drawing Sheet

METHOD AND APPARATUS FOR CODING AND FOR DECODING A PICTURE SEQUENCE

FIELD OF THE INVENTION

The invention relates to a method and an apparatus for coding and decoding a picture sequence.

BACKGROUND OF THE INVENTION

Predominantly motion-compensated hybrid codecs (encoder with simulated decoder contained therein) are used in data compression for moving picture sequences, such as e.g. in the MPEG1 or MPEG2 standard. By virtue of the regular insertion of intraframe-coded pictures (I frames), these compression methods enable access to any desired individual pictures in the entire bit stream or the playback of the bit stream from virtually any desired location. An intraframe-coded picture can be inherently individually decoded from the associated data and does not require any data from other pictures for the purpose of reconstruction. In contrast to this, interframe-coded pictures (P frames) cannot be inherently decoded but rather require in each case at least one reference picture for their reconstruction. This reference picture (anchor frame) must already have been decoded beforehand.

SUMMARY OF THE INVENTION

By virtue of the insertion of intraframe-coded pictures into a video bit stream, each picture of a picture sequence could be decoded, starting from such an intraframe-coded picture, without the video bit stream of the entire picture sequence having to be decoded. Each intraframe-coded picture could be decoded immediately and each interframe-coded picture could be decoded by decoding the chronologically nearest preceding intraframe-coded picture and subsequently decoding the picture sequence as far as the desired interframe-coded target picture.

A disadvantage of such a method is the high bit outlay necessary for intraframe-coded pictures. The factor of the required bits for intraframe-coded pictures I to the required bits for singly forward-predicted interframe-coded pictures P is approximately 10:1 in the typical MPEG2 format (M=3; N=12). In this case, N is the interval separating one intraframe-coded picture from the next and M is the interval separating an I picture and the succeeding P picture—or vice versa—and the interval separating one P picture and the next P picture. Situated in between there may be B pictures, which may be bi-directionally predicted for example.

The invention is based on the object of specifying a method for picture sequence coding and decoding in which it is possible to dispense with such I pictures or with their relatively frequent transmission, but decoding from virtually any desired location in a picture sequence can nevertheless take place.

The invention is based on the further object of specifying an apparatus for coding and for decoding a picture sequence with application of the method according to the invention.

As mentioned above, a codec usually contains a simulation of the receiver-end decoder. Coding errors thereof can thus also be taken into account by the encoder. The decoder simulation is usually arranged in a feedback loop of the hybrid codec. By virtue of the inventive insertion of an attenuation element into this feedback loop, the insertion and coding and the receiver-end decoding of intraframe-coded I pictures becomes superfluous. The attenuating element effects a decrease in amplitude values of predicted coefficients. The inventive attenuation in the feedback path of the hybrid codec therefore initially effects an artificial, actually undesirable deterioration in the prediction and leads to an increase in the prediction error to the coded. If the attenuation inserted in the feedback path is chosen suitably in terms of its size, however, then it is surprisingly possible to dispense entirely with the use of intraframe-coded pictures, without thereby losing the property of being able to decode the video bit stream at virtually any desired location.

The starting of the receiver-end decoding at any desired location in the bit stream or in a picture sequence occurs as follows: A grey-scale picture, preferably a grey-scale picture of average brightness, is used as the first prediction picture or as the reference picture. The first prediction error signal decoded in the receiver is combined with this grey-scale picture. The subsequent interframe-coded pictures are then decoded in a known manner. As a result of the insertion of the attenuation element in the encoder, the receiver-end reconstruction error generated in this way at the beginning is progressively reduced in the course of the decoding of the subsequent pictures since, on account of the attenuation element, errors which the encoder attempts to reduce have been artificially introduced in the encoder-end decoder function simulation as well.

The effect of the invention is that after the receiver-end decoding of L pictures, a viewer cannot perceive a difference between picture sequences which are coded in a known manner and contain I pictures at relatively short intervals, and picture sequences which are coded according to the invention and contain no I pictures at least over a relatively long period of time. B pictures may be arranged between the P pictures. The effect of these B pictures is no error propagation, on the one hand, but also no reduction of visible reconstruction errors, on the other hand.

The receiver-end video decoder can therefore display decoded pictures after the decoding of L pictures—or even a few pictures beforehand.

The value of the parameter L depends on the setting of the attenuation D of an attenuation element in the feedback of the codec and also determines the resulting bit rate. When L is small, the attenuation D is large and the convergence of the receiver-end decoding error is faster, but the bit rate is increased. When L is large, the attenuation D is small and the convergence of the receiver-end decoding error is slower, but the bit rate is low.

In principle, the inventive method for coding a picture sequence consists in the fact that transformed video data coefficients formed from difference values relating to pixel values of the picture sequence are entropy-encoded, with the transformed video data coefficients being subjected to inverse transformation, and being used in predicted form for the formation of the difference values relating to the pixel values, and in that the predicted pixel values are attenuated in terms of their amplitude prior to the formation of the difference values.

In principle, the inventive method for decoding a picture sequence of transformed and coded video data coefficients formed from difference values relating to pixel values of the picture sequence, consists in the fact that the entropy-decoded, transformed video data coefficients being subjected to inverse transformation and being combined in predicted form with the difference values, the difference values on which the transformed and coded video data coefficients are based being derived from predicted pixel values, attenuated in terms of their amplitude, and, at the start of decoding, the inverse-transformed video data coefficients being combined with a grey-scale picture.

In principle, the inventive apparatus for coding a picture sequence is provided with:

means for forming difference values, relating to the picture sequence, from pixel values, to which input data of the picture sequence are fed;

means for forming transformed video data coefficients which are derived from the difference values;

an entropy-encoder for the transformed video data coefficients;

means for forming inverse-transformed video data coefficients which are derived from the transformed video data coefficients;

means for forming predicted pixel values, whose output signal is used to form the difference values, an attenuation unit attenuating the predicted pixel values before they are used for forming the difference values.

In principle, the inventive apparatus for decoding a picture sequence is provided with:

an entropy-decoder for transformed video data coefficients;

means for forming inverse-transformed, decoded video data coefficients which contain difference values of pixel values;

means for forming predicted pixel values, whose output signal is combined with the difference values and constitutes the decoded picture sequence, in which the difference values are derived from predicted pixel values, attenuated in terms of their amplitude at the encoder end, and, at the start of decoding, the inverse-transformed video data coefficients are combined with a grey-scale picture in combination means.

BRIEF DESCRIPTION OF THE DRAWINGS

Exemplary embodiments of the invention are described with reference to the drawings, in which.

DETAILED DESCRIPTION OF PREFERRED EMBODIMENTS

Figure 3:
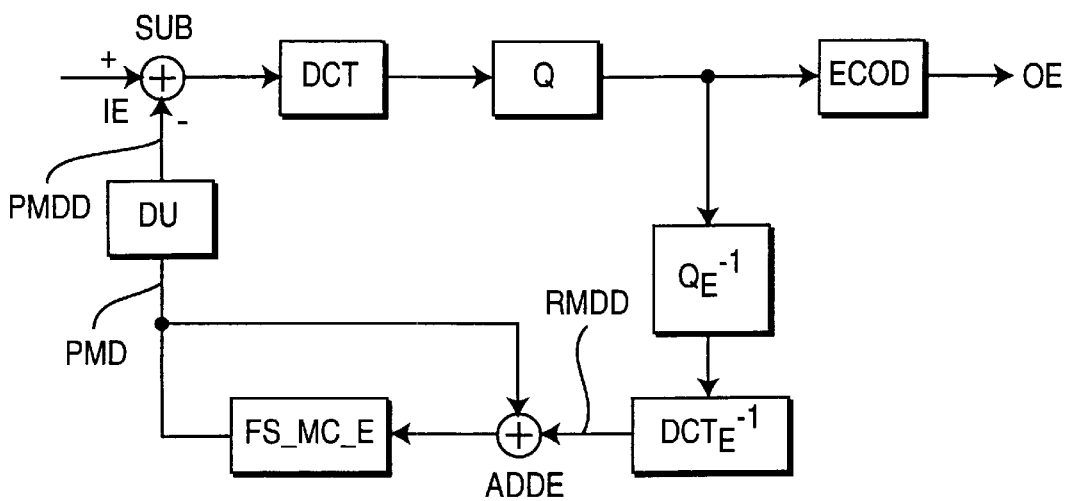
FIG. 3 shows an inventive encoder for video data.

The video data input signal IE of the encoder in FIG. 3 contains macroblock data for encoding. In the case of intraframe video data, a subtractor SUB simply allows these to pass. They are processed in discrete cosine transform means DCT and quantizing means Q and are fed to an entropy encoder ECOD, which outputs the encoder video data output signal OE. ECOD can, for example, carry out Huffman coding for the coefficients and add header information and motion vector data.

In the case of interframe video data, predicted macroblock data PMD are subtracted from the input signal IE in the subtractor SUB and the difference data are fed to the entropy encoder ECOD via the discrete cosine transform means DCT and the quantising means Q. The output signal of Q is also processed in inverse quantizing means $Q_E^{-1}$, the output signal of which is fed via inverse discrete cosine transform means $DCT_E^{-1}$ to the combiner ADDE in the form of reconstructed macroblock difference data RMDD. The output signal of ADDE is buffer-stored in a frame store in motion estimation and compensation means FS_MC_E, which carry out motion compensation for reconstructed macroblock data and output macroblock data PMD predicted in this way to the subtracting input of SUB and to the other input of the combiner ADDE.

The quantizing means Q, the inverse quantizing means $Q_E^{-1}$ and ECOD for example, are controlled by the occupancy level of the encoder buffer ENCB.

$Q_E^{-1}$, $DCT_E^{-1}$, ADDE and FS_MC_E constitute a simulation of the receiver-end decoder, which is also described in connection with FIG. 2.

Figure 1:
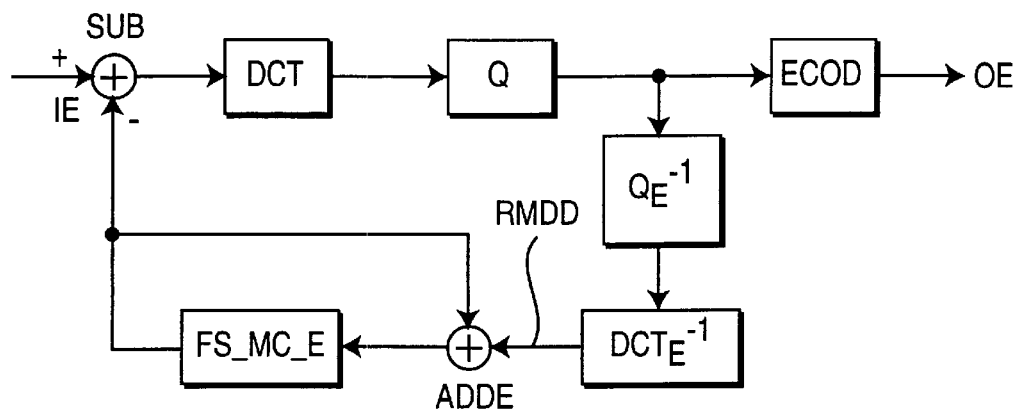
FIG. 1 shows a known encoder for video data.
Figure 2:
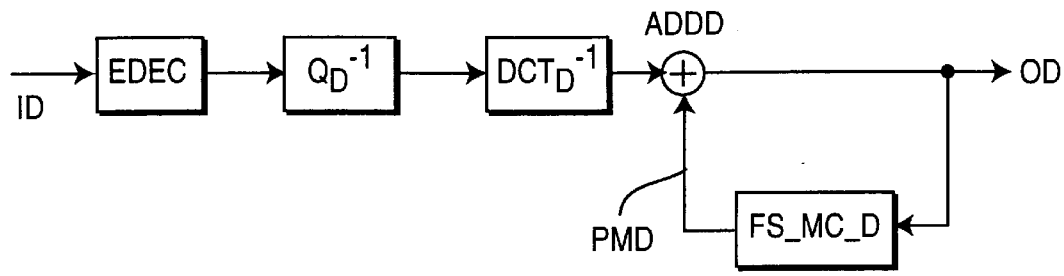
FIG. 2 shows a decoder for video data.

In FIG. 2, the video data input signal ID is fed via entropy decoder means EDEC, inverse quantizing means $Q_D^{-1}$ and inverse discrete cosine transform means $DCT_D^{-1}$ to a combiner ADDD, which outputs the video data output signal OD. EDEC can, for example, carry out Huffman decoding for the coefficients and decode and/or evaluate header information and motion vector data. $Q_E^{-1}$ and $Q_D^{-1}$, $DCT_E^{-1}$ and $DCT_D^{-1}$ and ECOD have a function which is the corresponding inverse of the function of Q, DCT and ECOD. The output signal of ADDD is buffer-stored in a frame store in motion compensation means FS_MC_D. FS_MC_D effects a motion compensation for reconstructed macroblock data.

In known decoders, the macroblock data PMD predicted in FS_MC_D are passed to the second input of the combiner ADDE only in the case of interframe-decoded macroblock data. In the case of intraframe-decoded macroblock data, the combiner ADDD simply passes on the output signal from $DCT_D^{-1}$.

In decoders according to the invention, which receive no intraframe-coded I pictures, the macroblock data PMD predicted in FS_MC_D are always passed to the second input of the combiner ADDE. Therefore, such a decoder according to the invention can in this respect be constructed more simply than known decoders. Detection as to whether intraframe-coded or interframe-coded video data are present can be obviated. A changeover for ADDD between the two modes can likewise be obviated. At the beginning of a picture sequence decoding, FS_MC_D or another unit only has to generate grey-scale picture data for a decoding starting picture for the second input of ADDE or in ADDD itself. In terms of digital image processing, however, this only means interrogating or passing on a fixedly set numerical value, that is to say a minimal outlay. Then, for example not until after a defined number of decoded pictures, output OD can output an output picture which is visible to a viewer. Until then, the picture may be blanked or a grey-scale value, preferably the starting grey-scale value mentioned above, may be displayed.

The starting grey-scale value may also be chosen adaptively, as a result of which convergence of the prediction errors can be achieved more rapidly. For example, if the DC difference coefficients of the macroblock data in the case of the current picture at the decoding starting instant have predominantly larger positive values, the starting grey-scale value can be chosen to be rather darker. If the DC difference coefficients of the macroblock data in the case of the current picture at the decoding starting instant have predominantly larger negative values, the starting grey-scale value can be chosen to be rather lighter. If the DC difference coefficients of the macroblock data in the case of the current picture at the decoding starting instant have predominantly small values, then an average brightness can rather be chosen for the starting grey-scale value.

The video data input signal IE of the encoder according to the invention in FIG. 3 contains macroblock data for encoding.

In a first embodiment of the encoder according to the invention, inframe video data are generated very rarely, in particularly at an interval N>12. In addition, the attenuation D according to the invention is used. In a second embodiment of the encoder according to the invention, intraframe video data are never generated, rather only the attenuation according to the invention is used. In the first embodiment, in the case of intraframe video data, a subtractor SUB simply allows them to pass. In both embodiments, they are processed in discrete cosine transform means DCT and quantizing means Q and are fed to a entropy encoder ECOD, which outputs the encoder video data output signal OE.

In the case of interframe video data in the first embodiment and always in the second embodiment, predicted and attenuated macroblock data PMDD are subtracted from the input signal IE in the subtractor SUB and the difference data are fed to the entropy encoder ECOD via the discrete cosine transform means DCT and the quantizing means Q. The output signal Q is also processed in inverse quantizing means $Q_E^{-1}$, whose output signal is fed via inverse discrete cosine transform means $DCT_E^{-1}$ to the combiner ADDE in the form of reconstructed macroblock difference data RMDD. The output signal of ADDE is buffer-stored in a frame store in motion-estimation and compensation means FC_MC_E, which carry out motion compensation for reconstructed macroblock data and output macroblock data PMD predicted in this way to the other input of the combiner ADDE and, via an attenuation unit DU, to the subtracting input of SUB.

The quantizing means Q, the inverse quantizing means $Q_E^{-1}$ and ECOD, for example, are controlled by the occupancy level of the encoder buffer ENCB. $Q_E^{-1}$, $DCT_E^{-1}$, ADDE and FS_MC_E once again constitute a simulation of the receiver-end decoder.

The attenuation unit DU reduces incoming pixel values for example by multiplication by a factor D. Small values of D lie in the range from 0.1 to 0.3, for example, and large values of D lie in the range from 0.5 to 0.9, for example. D preferably lies in the range from 0.4 to 0.8. DU can also subtract only a constant value or additionally a constant value from all the pixel values, but the pixel values cannot become smaller than the black level or, in the case of chrominance signals, a value corresponding to the black level. A limiter can be used to ensure that the pixel values do not reach an impermissible value. D may differ when coding luminance and chrominance signals.

The invention can be used for example in the transmission of digital television signals or in the transmission of digital video signals in networks such as the Internet or in a videophone or in the course of recording or in the course of mastering optical or magnetic storage media, e.g. DVD and in the course of playback thereof.

What is claimed, is:

1. Method for coding a picture sequence, comprising:
   transforming and quantizing pixel difference values relating to block-format pixel values of the picture sequence and to predicted pixel values, in order to provide quantized video data coefficients;
   inversely quantizing and inversely transforming the quantized video data coefficients to provide reconstructed pixel difference values;
   calculating from said reconstructed pixel difference values predicted pixel values intended for forming said pixel difference values;
   attenuating said predicted pixel values in terms of their amplitude prior to the formation of said pixel difference values;
   entropy-encoding said quantized video data coefficients, wherein the encoded picture sequence contains neither intraframe-coded pictures nor intraframe-coded pixel blocks.

2. Method according to claim 1, in which the attenuation is effected by multiplication of the predicted pixel values by a predetermined factor.

3. Method according to claim 1, in which the attenuation is effected by reduction of the absolute values of the predicted pixel values by a predetermined factor.

4. Method according to claim 1, in which the attenuation is effected by multiplication of the predicted pixel values by a predetermined factor.

5. Method according to claim 1, in which the attenuation is effected by reduction of the absolute values of the predicted pixel values by a predetermined factor.

6. Method for decoding a picture sequence of transformed, quantized and interframe-encoded video data coefficients formed from pixel difference values relating to block-format pixel values of the picture sequence, comprising:
   entropy-decoding the entropy-encoded video data coefficients, wherein the encoded picture sequence contains neither intraframe-coded pictures nor intraframe-coded pixel blocks;
   inversely quantizing and inversely transforming the entropy-decoded video data coefficients to provide pixel difference values;
   combining the pixel difference values with predicted pixel values in order to form the pixel values of the decoded picture sequence,
   wherein the predicted pixel values are derived from previously decoded pixel values of the decoded picture sequence and wherein upon starting the decoding the inversely transformed pixel difference values are combined with a grey-scale picture.

7. Method according to claim 6, in which the grey-scale value for a starting picture is determined adaptively.

8. Method according to claim 7, in which the grey-scale value for a starting picture is determined adaptively.

9. Apparatus for coding a picture sequence, said apparatus comprising:
   means for forming pixel difference values, wherein block-format pixel values input data of the picture sequence are fed to said means for forming pixel difference values;
   means for forming transformed and quantized video data coefficients from the pixel difference values;
   an entropy-encoder for the quantized video data coefficients, wherein the encoded picture sequence contains neither intraframe-coded pictures nor intraframe-coded pixel blocks;
   means for forming inverse-quantized and inverse-transformed reconstructed pixel difference values from the video data coefficients;
   means for forming predicted pixel values from said reconstructed pixel difference values;
   an attenuation unit for attenuating the predicted pixel values before they are used for forming the difference values.

10. Apparatus for decoding a picture sequence of transformed, quantized and interframe-encoded video data coefficients formed from difference values relating to block-format pixel values of the picture sequence, said apparatus comprising:

an entropy-decoder for encoded video data coefficients, wherein the encoded picture sequence contains neither intraframe-coded pictures nor intraframe-coded pixel blocks;

means for forming inverse-quantized and inverse-transformed pixel difference values from the entropy-decoded video data coefficients;

means for forming predicted pixel values from the pixel difference values, wherein the predicted pixel values are derived from previously decoded pixel values of the decoded picture sequence;

means for combining the pixel difference values and the predicted pixel values in order to form the pixel values of the decoded picture sequence, wherein upon starting the decoding, the inverse-transformed pixel difference values are combined with a grey-scale picture.

11. Recording medium, in particular optical disc, having video data which are coded by a method according to claim 1.

* * * * *